United States Patent [19]

Lehe

[11] 3,837,319

[45] Sept. 24, 1974

[54] SLATTED FLOOR SYSTEM

[76] Inventor: Russell B. Lehe, 400 Ascot Dr., Park Ridge, Ill. 60068

[22] Filed: Sept. 5, 1972

[21] Appl. No.: 286,013

[52] U.S. Cl.......................... 119/28, 52/586, 52/588
[51] Int. Cl.............................................. A01k 1/00
[58] Field of Search ................ 119/28; 52/586, 588

[56] References Cited
UNITED STATES PATENTS

| | | | |
|---|---|---|---|
| 2,711,231 | 6/1955 | Spangler | 52/588 |
| 3,680,530 | 8/1972 | Drawsky | 119/28 |
| 3,716,027 | 2/1973 | Vickstrom et al. | 119/28 |
| 3,721,215 | 3/1973 | Vickstrom et al. | 119/28 |
| 3,757,743 | 9/1973 | Lehe | 119/28 |

*Primary Examiner*—Hugh R. Chamblee
*Assistant Examiner*—J. N. Eskovitz
*Attorney, Agent, or Firm*—M. Lois Dierstein

[57] ABSTRACT

A lightweight, easily - assembled slatted flooring system for an animal enclosure comprises a plurality of U-shaped main channels interconnected in spaced-parallel relationship by U-shaped connectors, each connector having shaped ends extending from two legs which engage similarly shaped outer channels at the upper, outer corners of each main channel.

1 Claim, 3 Drawing Figures

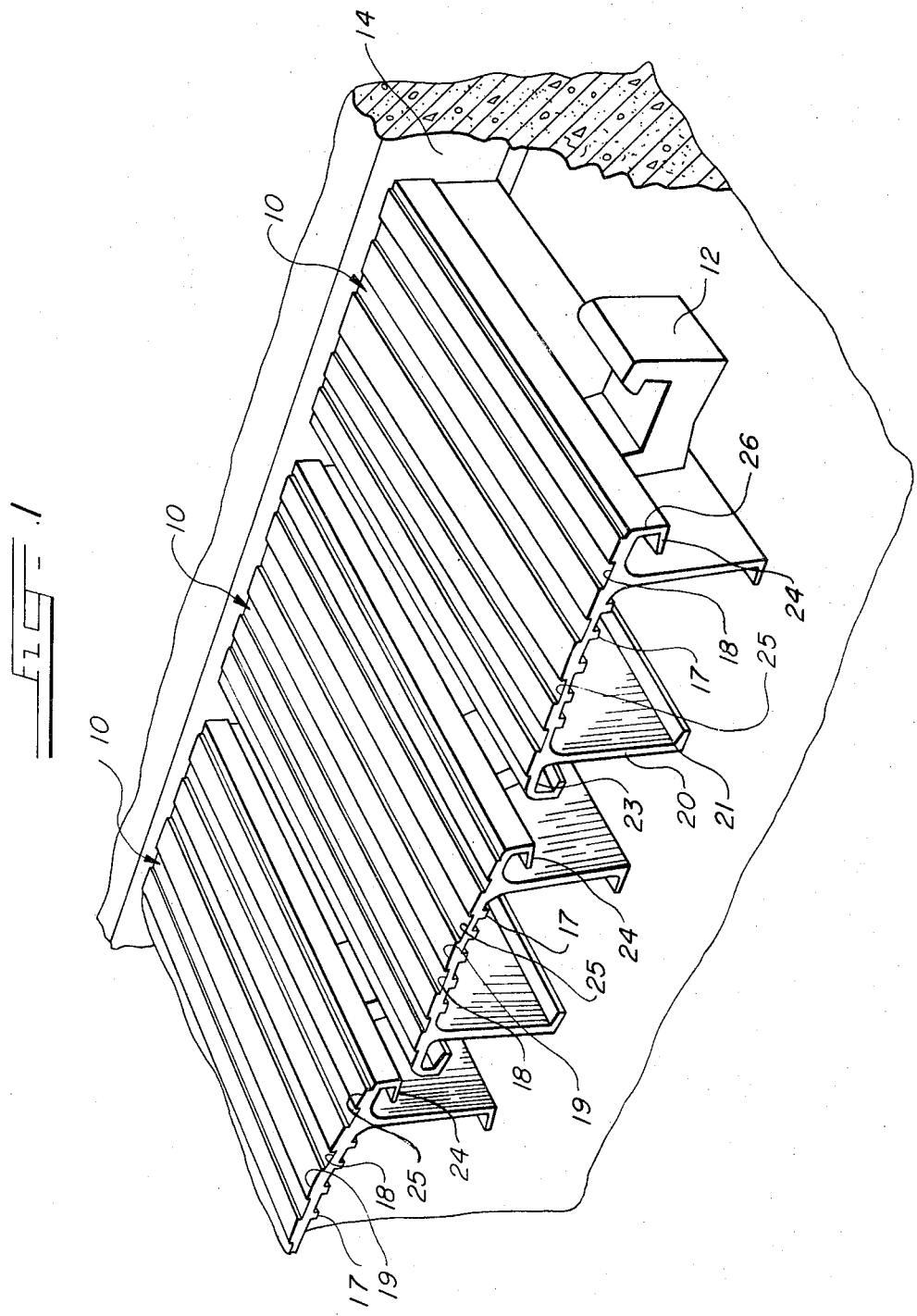

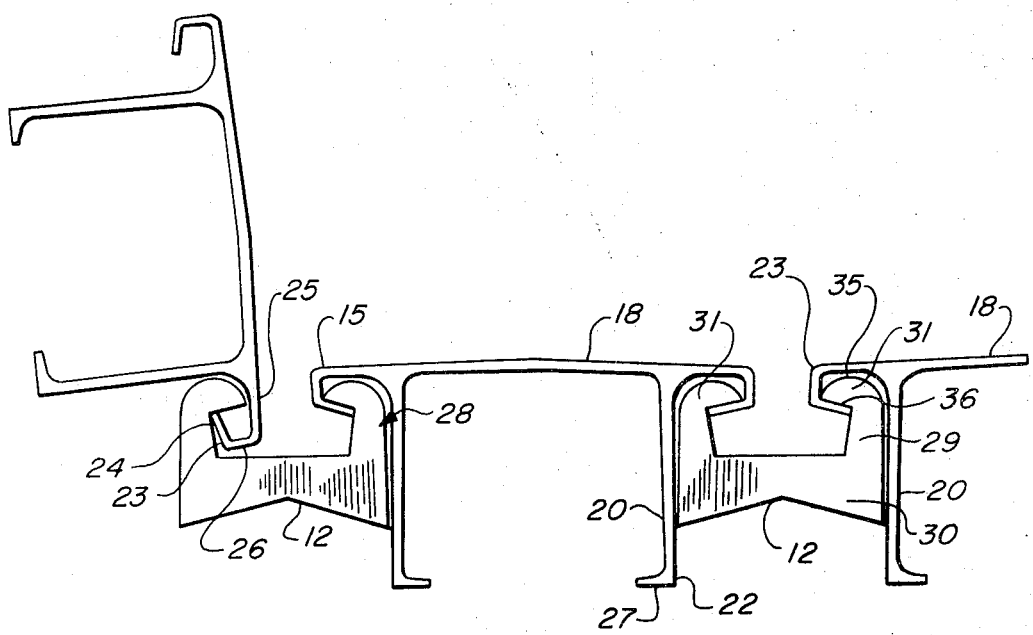
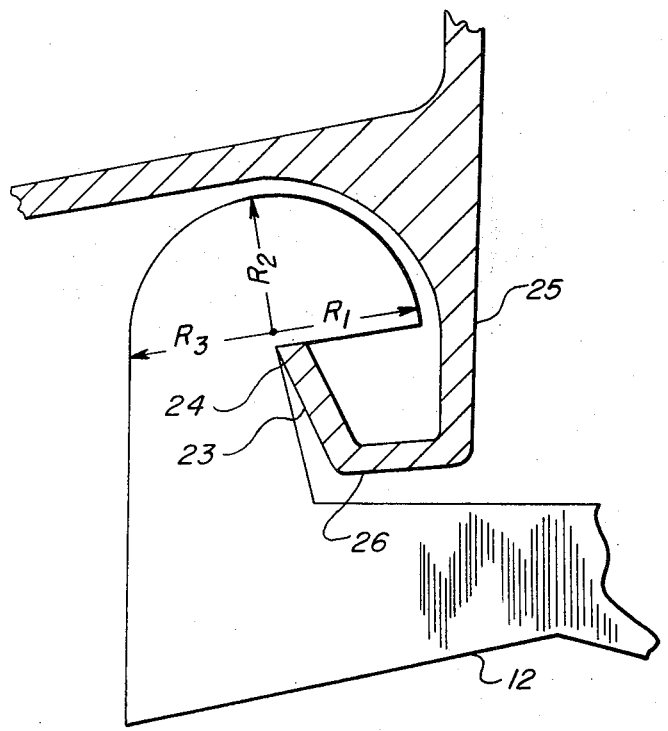

SLATTED FLOOR SYSTEM

This invention pertains to a slatted floor system and to the devices connecting the slats together.

The invention is particularly applicable to slatted flooring used in raising farm animals in a confined area and will be described with particular reference thereto, although the invention can be used for any slatted floor arrangement wherein a permanent, easily-assembled, smooth, slatted floor is desired.

It has long been recognized that the key to profitable production of farm animals raised in confinement is sanitation. Clean environments have heretofore been provided by erecting an enclosure having slatted flooring over a central portion thereof and a pit containing water underneath the flooring through which waste matter can be washed away.

Such flooring has typically been constructed of wood which has proven undesirable for a number of reasons. Wood becomes slippery when wet or when impregnated with waste. It is unsanitary and difficult to maintain and lasts a relatively short time. Some animals, particularly swine, have chewed through wooden slats. Other types of flooring have disadvantages also. Steel floors encounter severe corrosion problems. Concrete slats are costly to transport and install and often chip or crack, thereby resulting in slat failure. They are unsanitary and the usually rough surfaces cause knee and hock abrasions to the animal.

These problems have been at least partially overcome by using a flooring comprising extruded aluminum channels arranged in spaced-parallel relationship. However, the channels have heretofore been interconnected and assembled by means which are either time consuming and/or lack sufficient rigidity to support or brace the channels from sidewall deflection or they are difficult to manufacture.

One such arrangement used a U-shaped connector having V-shaped ends to interconnect the channels with the U-shaped portion of the connector fitting on top of a channel and the V-shaped ends interlocking the adjoining channels' sidewalls. The arrangement also used spacer clips fastened by nail to supporting joists from the top of the channels. While such an arrangement rigidly secured the slats together, the connectors and spacer clips themselves, being on top of the slats, were obstructions to what was otherwise a smooth flooring surface. Also there was difficulty in assembling the flooring in that each channel, while having loose connectors resting thereon, had to be juggled into interlocking position and secured by nailing to joists.

Another arrangement used a connecting bar extending the width of the flooring to connect and space the channels by attaching the same to the underside of the channels. However, the bar afforded no structural support for the channel, permitting the sidewalls to flex under load. In addition, a tool was needed to spread the channels' sidewalls to fit over the connector bar, which operation had to be done while working underneath the flooring system in the pit. Furthermore, difficulty was encountered in assembling a large number of slats to a single connector bar in that the bar had to be held horizontally while the slats' sidewalls were spread to engage the channel's underside with the connector prongs.

Aluminum slatted floors having X-shaped spacer/locks located near the top of the slats have been proposed to overcome the disadvantages of the prior art systems. Although these floors were easy to assemble, the slats were expensive and difficult to manufacture and it was difficult to lock the spacer/locks in position.

The present invention contemplates a slat/connector system which allows the flooring to be assembled faster and more efficiently than those systems previously described while also providing a loadcarrying connection which rigidizes the assembled flooring. In addition, the slats contemplated by the present invention are easier to make than those previously described and the slats require less material, thereby reducing the cost of manufacture.

In accordance with the present invention, there is provided a plurality of main channels assembled and held in spaced-parallel relationship by connectors. Each main channel has a small outer channel formed by a U-shaped flange extending outwardly and downwardly from each of its upper, outer corners. Each connector has similarly-shaped ends extending therefrom. These ends fit into and interlock with the outer channels, thereby joining together two adjacent main channels.

The connector contacts the sidewalls when the flooring is assembled and braces the sidewalls against deflection.

In the preferred embodiment, the connector is U-shaped and a rigid connection is assured by providing a projection or bump on one end of the connector which fits into an outer channel when the flooring is assembled.

To assemble, the connectors are hand inserted in one outer channel. The adjacent channel is then held in an inverted position and moved until its outer channel fits over the free connector end. The adjacent channel is then rotated downwardly into its assembled position, thereby providing a rigid, interlocking connection.

The principal object of this invention is to provide a light-weight slatted flooring system which is easily assembled.

Another object of the invention is to provide a connection for slatted flooring systems which braces the slats against deflection.

A further object is to provide a slatted flooring system with slats rigidly interconnected.

A further object of the invention is to provide an improved slatted flooring system and method of making the same which is both simple and economical.

The invention may take physical form in certain parts and arrangements of parts, are preferred embodiment of which will be described in detail herein and illustrated in the accompanying drawings which form a part hereof and wherein:

FIG. 1 is a perspective view of the assembled flooring;

FIG. 2 is a cross-sectional elevational view of the channel and connector in accordance with the invention; and FIG. 3 is an enlarged fragmentary view of FIG. 2, showing the joint between the connector and channel.

Referring now to the drawings wherein the showings are for the purpose of illustrating a preferred embodiment of the invention only and not for the purpose of limiting same, FIG. 1 illustrates the general arrangement of the slatted flooring construction. The flooring comprises a plurality of longitudinally extending, inverted U-shaped main channels 10. Connectors 12 interlock the channels 10 in spaced-parallel relationships. The flooring is supported by the end walls 14 of a pit which the flooring covers.

Not shown because unnecessary to the description of the invention is the farm animal enclosure. Such enclosure generally comprises a frame structure having a concrete floor adjacent the slatted flooring. Usually the slatted flooring is in the center of the enclosure with the concrete floor or slabs on both sides of the slatted flooring. Another typical enclosure utilizes a concrete center section with slatted floors on both sides of the center section. Either arrangement permits easy maintenance because the refuse can be washed from the concrete pads through the slatted flooring to the pit below.

Of course, the slatted flooring can comprise the complete floor of the enclosure. Such construction requires relatively long channel members and channel supports in the form of joints or a center wall to prevent the channel member from deflecting vertically downward under the weight of the animals.

As is shown in the cross-sectional view of the channel in FIG. 2, each main channel 10 is in the shape of an inverted U having a base 18, defining a load carrying surface and a pair of sidewalls 20. The base can be flat, although in the preferred embodiment it is slightly crowned with a plurality of longitudinally-extending ribs 17, 19 on the lower and upper surfaces respectively. Ribbing and crowning the base 18 increases its rigidity, thereby allowing the channel to be constructed of a thinner cross-sectional area than would otherwise be required.

Extending inwardly from the bottom of each channel sidewall 20 is a support flange 22 having a flat bottom surface 27. The flanges should be long enough and the surfaces 27 should be in a common plane so as to provide a stable support for each main channel, thereby preventing any tendency of the channel to rock or roll under load. The flanges are shown as filleted 21 to the sidewall, thereby strengthening the sidewall and flange joint.

Formed at the outer juncture of each sidewall 20 with the base 18 is an outer channel 23 extending the entire length of the main channel 10. The channel 23 is formed by a U-shaped flange 15 and has a lower wall surface 24, extend the channel. The channel 23 is formed by aU-shaped flange 15 and has a lower wall surface 24, an upper wall surface 25, and a sidewall surface 26. Lower wall surface 24 slopes downwardly at an angle of 3° or 4°.

The connector 12, can assume a wide variety of cross-sectional configurations such as trapezoidal, rectangular, etc. However, in the preferred embodiment the connector 12 is U-shaped in cross section and comprises a pair of upper legs 29 and a pair of lower legs 30. Extending from each upper leg is a semicircular end 31 which fits into the channel 23 when the slatted flooring is assembled. The upper ends 31 have arcuate upper 35 and straight lower surfaces 36, defined by radii R-2 and R-1 respectively. The width of the upper leg adjacent end portion 31 is defined by R-3 which is equal to R-2 and R-1. The length of lower surface 36 of end 31 is the same as the length of lower surface 24 of the channel 23 and the distance between lower 36 and upper 35 surfaces of end 31 is the same as the distance between lower 24 and upper 25 surfaces of channel 23 so that end 31 fits snugly into channel 23. The projection or bump 28 located on the outside surface of end 31 at a point in line with lower surface 36 further assures a tight connection. Lower surface 36 slopes downwardly at an angle of 3° or 4° facilitate drainage from the outer channel 23.

The outer surfaces of legs 29 and 30 of the connector engage the sidewalls 20 when the flooring is assembled, thus firmly supporting the sidewalls. The spacing between channels is therefore a direct function of the distance between the outer surfaces of legs 29 and 30, being increased or decreased as the distance between the outer surfaces of legs 29 and 30 increases or decreases respectively.

The inner surfaces of bottom legs 30 taper toward the center of the connector 12, giving a slight V-shape to the bottom of the connector. The V-shape is not necessary, however, and the bottom surface of the connector could be straight, thereby eliminating the lower legs.

Structurally, once the flooring is assembled, the connector provides a rigid brace which prevents movement between adjacent channels. The connector ends 31 in conjunction with channels 23 provide means for assembling the flooring system and once assembled serve further to stabilize the channels against any rock or rolling motion imparted thereto.

The flooring system is assembled by placing one of the main channels 10 over the pit supports 14 in an upright position; inserting the ends 31 of several connectors 12 into spaced points on the outer channels 23 of the main channel; positioning another channel 10 in an inverted relationship on top of the first channel; moving the inverted channel 10 laterally until its outer channel 23 contacts the free ends 31 of the connectors and then rotating the inverted channel 10 into an upright position, thereby seating ends 31 into channels 23.

The rotation of the channel 23 into the connector end 31 is assured because the distance between the upper wall 25 and lower wall 24 is the same as the distance between upper surface 35 and lower surface 36 of the connector 12. Therefore, a good connection is assured.

In addition to rigidizing the connection between adjacent channels, the projection 28 also prevents the connector from walking or sliding down the length of the channel. This sliding can also be prevented by applying a strip of adhesive to the outer surface of the connector legs or by notching or turning up a portion of the lower wall surface 24 of the outer channel.

The channel sidewalls 20 are almost perpendicular to the base 18 but they may taper slightly outwardly at an angle of 1 or 2° to avoid any tendency of the sidewalls to deform inwardly under load pressure.

The connector legs 29 and 30 should engage the sidewalls 20 for half of their width, although it is possible to extend the legs so that the connector legs engage the channel sidewalls 20 for the entire width of the sidewalls.

It is the essence of the invention, therefore, to construct a slatted flooring system having main channels of a shape to incorporate therein small outer channels to be used in conjunction with a connector which allows the main channels to be assembled and rigidly interlocked together.

Having thus described my invention, I claim:

1. A floor construction comprising (a) a plurality of spaced parallel extending generally U-shaped, inverted main channels, each main channel including a base defining a load carrying surface, and a pair of sidewalls extending downwardly from the edges of said base, each main channel further having a pair of longitudinally-extending outer channels, one at each outer juncture of a sidewall with said base, said outer channel being formed by a U-shaped flange extending outwardly and downwardly from each of said outer junctures and being defined by upper and lower spaced walls and one sidewall, and (b) a plurality of connectors interconnecting adjacent main channels in spaced-parallel relationship, each connector having a pair of upper legs and a pair of lower legs, said upper legs having ends adapted to extend into said outer channels on adjacent main channels and to interlock with said outer channels, the outer surfaces of said upper and lower legs contacting said main channel sidewalls when adjacent main channels are interconnected, said ends of said upper legs of said connector having an upper arcuate and a lower straight surface, the distance between said upper and lower surfaces of said ends being the same as the distance between said upper and lower spaced walls of said outer channel.

* * * * *